(12) United States Patent
Wang et al.

(10) Patent No.: US 10,114,529 B2
(45) Date of Patent: Oct. 30, 2018

(54) SCREEN-UNLOCKING METHOD, SYSTEM AND TOUCH SCREEN TERMINAL

(71) Applicant: HUIZHOU TCL MOBILE COMMUNICATION CO., LTD, Huizhou, Guangdong (CN)

(72) Inventors: Yahui Wang, Guangdong (CN); Minli Luo, Guangdong (CN)

(73) Assignee: Huizhou TCL Mobile Communication Co., Ltd, Huizhou (CN)

( * ) Notice: Subject to any disclaimer, the term of this patent is extended or adjusted under 35 U.S.C. 154(b) by 488 days.

(21) Appl. No.: 14/386,674

(22) PCT Filed: Mar. 22, 2013

(86) PCT No.: PCT/CN2013/073060
§ 371 (c)(1),
(2) Date: Sep. 19, 2014

(87) PCT Pub. No.: WO2013/185500
PCT Pub. Date: Dec. 19, 2013

(65) Prior Publication Data
US 2015/0052487 A1 Feb. 19, 2015

(30) Foreign Application Priority Data
Jun. 11, 2012 (CN) .......................... 2012 1 0191645

(51) Int. Cl.
*G06F 3/0484* (2013.01)
*G06F 3/0487* (2013.01)
(Continued)

(52) U.S. Cl.
CPC .......... *G06F 3/0484* (2013.01); *G06F 3/0487* (2013.01); *G06F 3/0488* (2013.01); *G06F 21/00* (2013.01)

(58) Field of Classification Search
CPC ............... G06F 3/0488; G06F 3/04842; G06F 2203/04105; G06F 2203/04104;
(Continued)

(56) References Cited

U.S. PATENT DOCUMENTS 7,761,801 B2 * 7/2010 Park ...................... G06F 3/0488
715/706
8,504,842 B1 * 8/2013 Meacham ............. G06F 3/0488
713/182
(Continued)

FOREIGN PATENT DOCUMENTS

CN 102270097 A 12/2011
CN 102314295 A 1/2012
(Continued)

OTHER PUBLICATIONS

Supplementary European Search Report dated Jan. 11, 2016 for Application No. EP 13 80 3636.
English translation of KR 2009-0012836 A.

*Primary Examiner* — Renee D Chavez
*Assistant Examiner* — Carl P Lobo

(57) ABSTRACT

The present disclosure provides a system for backing up and recovering data, which comprises a mobile terminal and a server. The mobile terminal comprises: a parameter backup module, being configured to receive a lockup request for backing up system setting parameters of the mobile terminal, and enable the mobile terminal to transmit the system setting parameters to a network server according to the backup request so that the system setting parameters are backed up by the network server; a request-for-recovery module, being configured to receive a recovery request for recovering the system setting parameters to the mobile terminal and enable the mobile terminal to transmit the recovery request to the network server; and a recovery control module, being configured to receive the system
(Continued)

setting parameters that are transmitted by the network server according to the recovery request and control to recover a system state of the mobile terminal to a state that is set by the system setting parameters. In this way, the present disclosure can back up the system setting parameters of the mobile terminal to the server, and recover the system setting parameters from the server to the mobile terminal during a data recovery. Thus, the present disclosure brings great convenience and a new experience to users.

7 Claims, 3 Drawing Sheets

(51) Int. Cl.
  *G06F 21/00* (2013.01)
  *G06F 3/0488* (2013.01)
(58) Field of Classification Search
  CPC ...... G06F 21/36; G06F 3/0416; G06F 1/1637; G06F 3/04817; G06F 3/017; G06F 17/30424; G06F 21/6281; G06F 3/0487; G06F 3/04845; G06F 21/31; G06F 21/35; G06F 1/1694; G06F 3/048; G06F 3/04886; G06F 3/0484; H04L 41/22; H04M 2250/02
  See application file for complete search history.

(56) References Cited

U.S. PATENT DOCUMENTS

| | | | |
|---|---|---|---|
| 2006/0137015 A1* | 6/2006 | Fahrny | H04N 7/17318 726/26 |
| 2007/0150842 A1* | 6/2007 | Chaudhri | G06F 3/04883 715/863 |
| 2008/0259042 A1* | 10/2008 | Thorn | G06F 3/04883 345/173 |
| 2009/0189878 A1* | 7/2009 | Goertz | G06F 3/0421 345/175 |
| 2009/0289916 A1* | 11/2009 | Dai | G06F 3/04883 345/173 |
| 2010/0020035 A1* | 1/2010 | Ryu | G06F 3/04883 345/173 |
| 2010/0269040 A1 | 1/2010 | Lee | |
| 2010/0099394 A1* | 4/2010 | Hainzl | G06F 1/32 455/418 |
| 2010/0162182 A1* | 6/2010 | Oh | G06F 3/04883 715/863 |
| 2010/0248689 A1* | 9/2010 | Teng | H04M 1/67 455/411 |
| 2010/0309147 A1* | 12/2010 | Fleizach | G06F 3/04883 345/173 |
| 2011/0041102 A1* | 2/2011 | Kim | G06F 3/04883 715/863 |
| 2011/0053641 A1* | 3/2011 | Lee | G06F 1/1626 455/556.1 |
| 2011/0081889 A1* | 4/2011 | Gao | G06F 3/038 455/411 |
| 2011/0175852 A1* | 7/2011 | Goertz | G06F 3/042 345/175 |
| 2011/0187727 A1* | 8/2011 | Ahn | G06F 3/04883 345/473 |
| 2011/0252357 A1* | 10/2011 | Chaudhri | G06F 3/04883 715/780 |
| 2011/0271181 A1* | 11/2011 | Tsai | G06F 3/04883 715/702 |
| 2011/0279384 A1* | 11/2011 | Miller | G06F 3/04883 345/173 |
| 2011/0283241 A1* | 11/2011 | Miller | G06F 3/04883 715/863 |
| 2011/0300831 A1* | 12/2011 | Chin | G06F 1/3203 455/411 |
| 2011/0302532 A1* | 12/2011 | Missig | G06F 3/0416 715/823 |
| 2012/0032891 A1* | 2/2012 | Parivar | G06F 3/04883 345/173 |
| 2012/0036556 A1* | 2/2012 | LeBeau | G06F 3/048 726/3 |
| 2012/0044156 A1* | 2/2012 | Michaelis | G06F 3/03547 345/173 |
| 2012/0050198 A1* | 3/2012 | Cannon | A63F 13/245 3/245 |
| 2012/0054057 A1* | 3/2012 | O'Connell | G06F 21/36 705/26.1 |
| 2012/0124644 A1* | 5/2012 | LeBeau | G06F 3/048 726/3 |
| 2012/0252410 A1* | 10/2012 | Williams | G06F 21/36 455/411 |
| 2013/0333020 A1* | 12/2013 | Deshpande | G06F 21/36 726/16 |

FOREIGN PATENT DOCUMENTS

| | | |
|---|---|---|
| CN | 102750093 A | 10/2012 |
| KR | 20090012836 A | 2/2009 |
| WO | WO2011037366 A2 | 9/2009 |

* cited by examiner

SCREEN-UNLOCKING METHOD, SYSTEM AND TOUCH SCREEN TERMINAL

RELATED APPLICATION

This application is a national phase entry under 35 USC 371 of International Patent Application No. PCT/CN2013/073060 filed on 22 Mar. 2013, which was published on 19 Dec. 2013 with International Publication Number WO 2013/185500 A1, which claims priority from Chinese Patent Application No. 201210191645.9 filed on 11 Jun. 2012, the disclosures of which are incorporated in their entirety by reference herein.

FIELD OF THE INVENTION

The present disclosure relates to a screen-unlocking method, system and touch screen terminal.

BACKGROUND OF THE INVENTION

Owing to the advancement of the science and technologies, more and more touch screen terminals have been widely used in people's daily life, for example, mobile phones, tablet computers and digital photo frames, etc. In order to prevent the touch screen terminals from being accidentally activated or from being activated for a long time to cause power consumption, the system of the touch screen terminals may be set in such a way that the display screen of the touch screen automatically enters into a locked operation mode when they are not used by users. Then, when it is necessary to activate the display screen of the touch screen that is in the locked operation mode, typically the display screen is unlocked by a slide unlocking operation or by use of a stationary keypad.

However, for the conventional unlocking manner, the unlocking interface is relatively monotonous and cannot satisfy the requirements for personalization, and this decreases the flexibility of the unlocking operation. Furthermore, the slide unlocking operation usually requires continuous sliding from the unlocking start point to the unlocking finish point in order to smoothly accomplish the unlocking operation, which is inconvenient for the users.

SUMMARY OF THE INVENTION

A main technical problem to be solved by the present disclosure is to provide a screen-unlocking method, system and touch screen terminal, by which a user can conveniently unlock the screen by touching unlocking patterns respectively at least two times.

To achieve the aforesaid technical problem, one technical solution adopted by the present disclosure is to provide a screen-unlocking method. The screen-unlocking method comprises: displaying at least a first pattern at a first position on a screen when the screen is in a locked state; receiving a first instruction generated by at least one clicking or touching on the screen, and determining whether the first instruction is generated by the at least one clicking or touching on the first pattern, wherein the first position is different from a second position; activating a waiting for another instruction generated by at least another clicking or touching according to the first instruction if the first instruction is generated by the at least one clicking or touching on the first pattern; receiving a second instruction generated by at least another clicking or touching on the screen, and determining whether the second instruction is generated by the at least another clicking or touching on a second pattern, wherein the second pattern is displayed at the second position, and the first pattern and the second pattern are two object patterns that are operatively used in combination; and terminating the waiting for the another instruction generated by the another clicking or touching to unlock the screen if the second instruction is generated by at least another clicking or touching on the second pattern.

Preferably, the step of activating a waiting for another instruction generated by at least another clicking or touching according to the first instruction comprises: activating the waiting for the another instruction generated by the at least another clicking or touching according to the first instruction, and meanwhile, moving the first pattern to bypass the position of the second pattern along a random or predetermined trace on the screen.

Preferably, the step of terminating the waiting for the another instruction generated by the another clicking or touching if the second instruction is generated by the at least another clicking or touching on the second pattern comprises: if the second instruction is generated by the at least another clicking or touching on the second pattern, moving the first pattern to the position of the second pattern and displaying an animation in which a target is hit on as to terminate the waiting for the another instruction generated by the another clicking or touching.

Preferably, the step of displaying at least one first pattern at a first position on a screen when the screen is in a locked state comprises: when the screen is in the locked state, receiving an instruction of lighting up the screen to light up the screen, and meanwhile, displaying the at least one first pattern and the at least one second pattern at the first position and the second position of the screen respectively.

Preferably, the step of displaying the at least one first pattern and the at least one second pattern at the first position and the second position of the screen respectively comprises: displaying the at least one first pattern and the at least one second pattern that are chosen randomly at the first position and the second position of the screen respectively.

Preferably, the step of displaying the at least one first pattern and the at least one second pattern at the first position and the second position of the screen respectively comprises: displaying the at least one first pattern and the at least one second pattern that are chosen randomly at the first position and the second position, which are chosen randomly, of the screen respectively.

To solve the aforesaid technical problem, another technical solution adopted by the present disclosure is to provide a screen-unlocking system. The screen-unlocking system comprises: a display module, being configured to display at least one first pattern at a first position and display a second pattern at a second position on a screen when the screen is in a locked state; a first determining module, being configured to receive a first instruction generated by at least one clicking or touching on the screen, and determine whether the first instruction is generated by at least one clicking or touching on the first pattern; a first controlling module, being configured to control to activate a waiting for another instruction generated by at least another clicking or touching according to the first instruction if the first instruction is generated by the at least one clicking or touching on the first pattern; a second determining module, being configured to receive a second instruction generated by at least another clicking or touching on the screen, and determine whether the second instruction is generated by the at least another clicking or touching on the second pattern; and a second controlling module, being configured to control to terminate the waiting for the another instruction generated by the another clicking or touching to unlock the screen if the second instruction is generated by the at least another clicking or touching on the second pattern.

Preferably, the system further comprises: a receiving and triggering module, being configured to receive an instruction of lighting up the screen to light up the screen when the screen is in the locked state.

Preferably, the system further comprises: a pattern-choosing module, being configured to randomly choose the first pattern and the second pattern to be displayed and output, the first pattern and the second pattern that are chosen to the display module after the instruction of lighting up the screen is received; and a position-choosing module, being configured to randomly choose the first position at which the first pattern should be displayed and the second position at which the second pattern should be displayed, and output the first position and the second position to the display module after the instruction of lighting up the screen is received.

Preferably, the system further comprises: a moving module, being configured to control the display module moving the first pattern to bypass the position of the second pattern along a random or predetermined trace on the screen after activating the waiting for the another instruction generated by the at least another clicking or touching according to the first instruction is activated.

Preferably, the system further comprises: an effect-expressing module, being configured to control the display module displaying that the first pattern is moved to the position of the second pattern and displaying an animation in which a target is hit if the second instruction is generated by the at least another clicking or touching on the second pattern.

To solve the aforesaid technical problem, yet another technical solution provided by the present disclosure is to provide a touch screen terminal which comprises the aforesaid screen-unlocking system.

Preferably, the touch screen terminal is a tablet computer, a mobile phone having a touch screen, or a digital photo frame.

As compared to the prior art, the benefits of the present disclosure are as follows: with the present disclosure, the user can unlock the screen by touching unlocking patterns respectively at least two times without the need of sliding on and touching the screen continuously, so the screen unlocking operation is time-saving and convenient.

Moreover, unlocking backgrounds and patterns are diversified and the positions of the unlocking patterns are not fixed, which brings more abundant and wonderful experiences to the user.

DETAILED DESCRIPTION OF THE INVENTION

Figure 1:
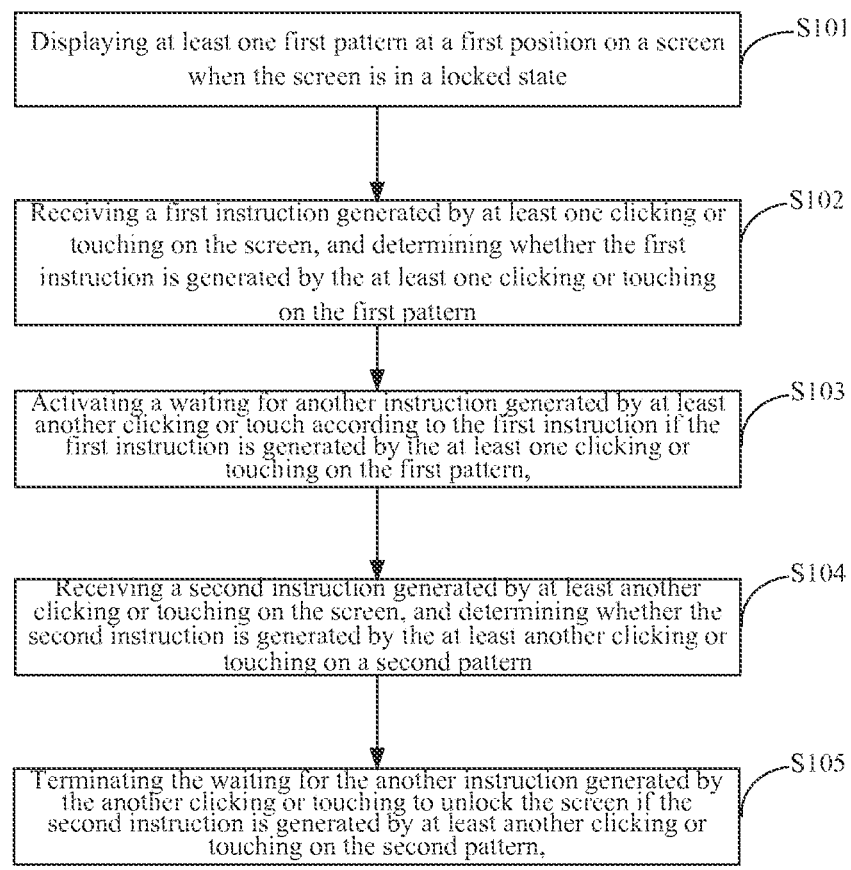
FIG. 1 is a flowchart diagram of an embodiment of a screen-unlocking method according to the present disclosure.

Referring to FIG. 1, an embodiment of a screen-unlocking method according to the present disclosure comprises:

Step S101: displaying at east one first pattern at a first position on a screen when the screen is in a locked state.

When the screen is in the locked state, an instruction of lighting up the screen is received to light up the screen and, meanwhile, at least one first pattern and at least one second pattern are displayed at a first position and a second position of the screen respectively. The aforesaid instruction of lighting up the screen may be generated by pressing various physical buttons such as a power button by a user. Of course, the process of receiving the instruction of lighting up the screen may also be omitted, and instead the screen keeps being lighted up.

The first pattern and the second pattern defined in the present disclosure are only used as the unlocking start point and the unlocking finish point in an exemplary application, so both the first pattern and the second pattern may be one or more patterns as long as the screen can be unlocked by at least one clicking or touching on the first pattern and the second pattern. The clicking or touching may be accomplished by one or more times of clicking or touching. The first position and the second position may be any positions that are chosen randomly on the screen, and the first position and the second position may be either the same as each other or different from each other.

Step S102: receiving a first instruction generated by at least one clicking or touching on the screen, and determining whether the first instruction is generated by the at least one clicking or touching on the first pattern.

When the screen is clicked or touched one or more times, a first instruction is generated and it is determined whether the first instruction is generated by clicking or touching the first pattern used as the unlocking start point one or more times. When the first pattern comprises several patterns, a first instruction is generated by clicking or touching the several patterns used as the first pattern one or more times. If the first instruction is generated by clicking or touching the first pattern used as the unlocking start point one or more times, step S103 is executed; and otherwise, no operation is executed.

Step S103: activating a waiting for another instruction generated by at least another clicking or touching according to the first instruction if the first instruction is generated by the at least one clicking or touching on the first pattern.

If the first instruction is generated by clicking or touching the first pattern one or more times, a waiting for an instruction generated by another clicking or touching according to the first instruction is activated through controlling. Meanwhile, the first pattern is controlled to move to bypass the position of the second pattern along a random or predetermined trace on the screen; and if the first pattern comprises several patterns, the several patterns are moved together to bypass the position of the second pattern on the screen.

Step S104: receiving a second instruction generated by at least another clicking or touching on the screen, and determining whether the second instruction is generated by the at least another clicking or touching on the second pattern.

After the first instruction is generated, a second instruction is generated by another one or more clickings or touchinges on the screen, and it is determined whether the second instruction is generated by another one or more clickings or touchinges on the second pattern as the unlocking finish point. When the second pattern comprises several patterns, a second instruction is generated by clicking or touching the several patterns used as the second pattern one or more times. If the second instruction is generated by clicking or touching the second pattern one or more times, step S105 is executed; and otherwise, no operation is executed.

The second pattern may not be displayed until this step, i.e., is not displayed in the aforesaid steps S101~S103.

Figure 2:
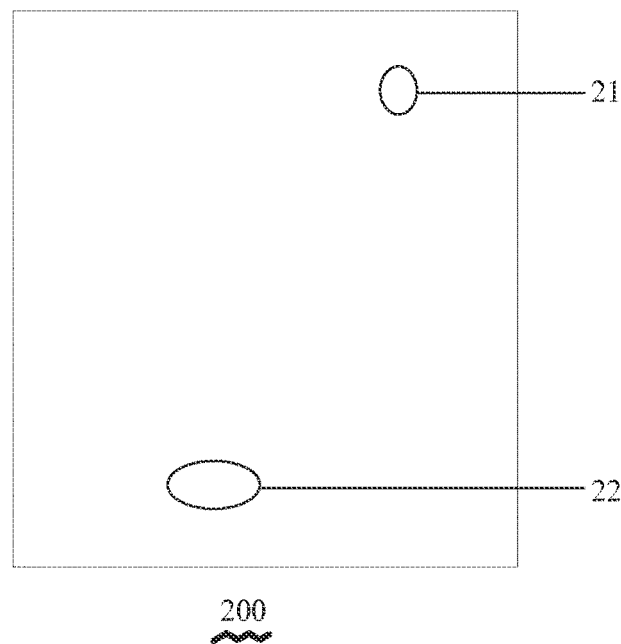
FIG. 2 is a schematic view of a screen unlocking interface in an embodiment of the screen-unlocking method according to the present disclosure.

Referring to FIG. 2, FIG. 2 is a schematic view of an embodiment of a screen unlocking interface in a screen-unlocking method according to the present disclosure. As shown in FIG. 2, the first pattern and the second pattern of this embodiment are each a single pattern, i.e., the first pattern and the second pattern are a pattern 21 and a pattern 22 respectively. When the instruction of lighting up the screen is received to light up the screen 200, the pattern 21 and the pattern 22 are displayed on the interface. The pattern 21 and the pattern 22 are displayed at positions chosen randomly. The pattern 21 and the pattern 22 may be displayed at different positions as shown in FIG. 2, or may be displayed at the same position. After being clicked or touched one or more times, the pattern 21 is moved to bypass the pattern 22 on the screen 200. After another one or more clicks or touches on the pattern 22, the pattern 21 is moved to the position of the pattern 22, and then an animation in which a target is hit is displayed on the screen 200, thus unlocking the screen.

Step S105: terminating the waiting for the another instruction generated by the another clicking or touching to unlock the screen if the second instruction is generated by the at least another clicking or touching on the second pattern.

If the second instruction is generated by another one or more clickings or touchinges on the second pattern, the first pattern is controlled to move to the position of the second pattern, and an animation in which a target is hit is displayed. Meanwhile, the waiting for an instruction generated by the another clicking or touching is terminated to unlock the screen. When the first pattern or the second pattern comprises several patterns, the several patterns of the first pattern are moved randomly to the position of any one or more patterns of the second pattern, and then an animation in which a target is hit is displayed.

Figure 3:
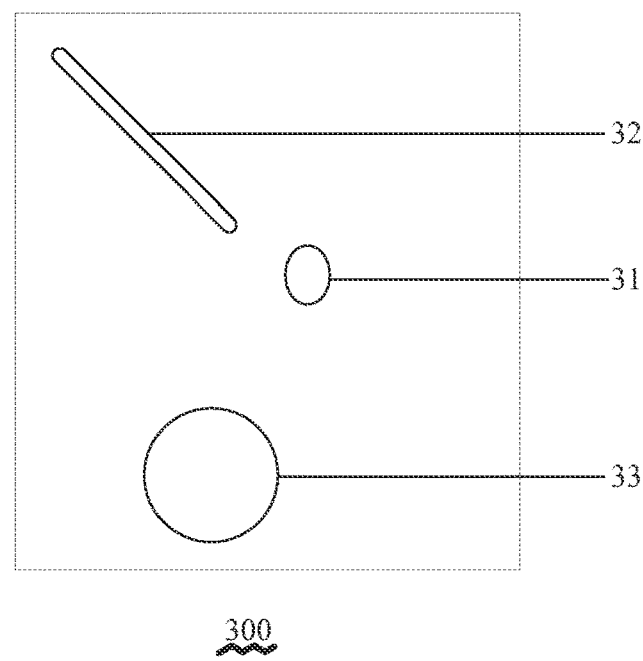
FIG. 3 is a schematic view of another screen unlocking interface in an embodiment of the screen-unlocking method according to the present disclosure.

Referring to FIG. 3, FIG. 3 is a schematic view of another screen interface in an embodiment of the screen-unlocking method according to the present disclosure. As shown in FIG. 3, the first pattern of this embodiment comprises a pattern 31 and a pattern 32, and the second pattern of this embodiment is a pattern 33. FIG. 3 shows the schematic view of the screen interface after the aforesaid step S103 is executed. In this embodiment, after the instruction of lighting up the screen is received to light up the screen, the pattern 31 is displayed at a position chosen randomly on the screen 300. After the pattern 31 is clicked or touched one or more times, the pattern 31 is moved on the screen 300 and, meanwhile, the pattern 32 is displayed at a position chosen randomly on the screen 300. After the pattern 32 is clicked or touched one or more times, the pattern 32 and the pattern 31 are moved together on the screen 300 and, meanwhile, the pattern 33 is displayed at a position chosen randomly on the screen 300. After the pattern 33 is clicked one or more times, both the pattern 31 and the pattern 32 are moved to the position of the pattern 33. Then, an animation in which a target is hit is displayed on the screen 300, and the screen is unlocked.

The first pattern or the second pattern may be any object patterns or object patterns used in combination, such as balls and ball holes, water and bottles, basketballs and basketball stands, or flowers and mud. These patterns may be patterns built in the system, or patterns preset and stored into the system by the user. Meanwhile, the user can set different scenes as the unlocking interface background according to his/her preferences. For example, a golf course with green lawns may be set as the unlocking interface background and, correspondingly, a golf ball, a hole and a brassie or the like may be used as the first pattern or the second pattern; or a basketball court may be set as the unlocking interface background and, correspondingly, a basketball and a basketball stand may be used as the first pattern or the second pattern.

Figure 4:
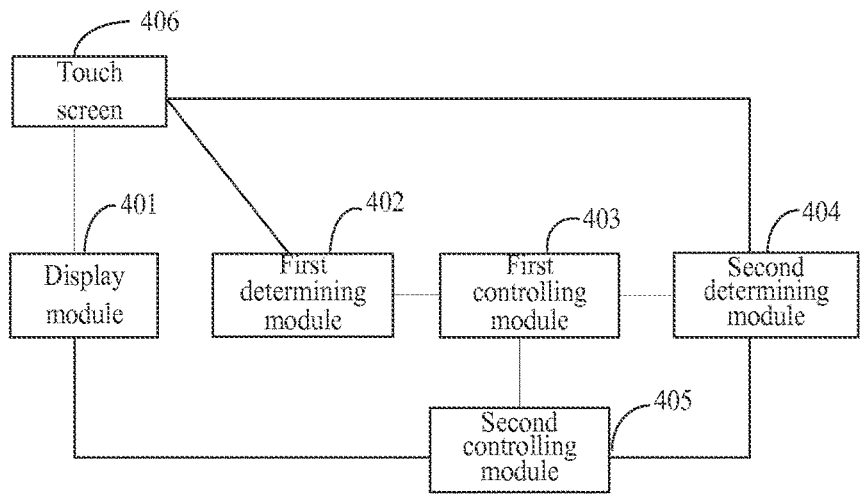
FIG. 4 is a functional block diagram of an embodiment of the screen-unlocking system according to the present disclosure.

Referring to FIG. 4, FIG. 4 is a functional block diagram of an embodiment of a screen-unlocking system according to the present disclosure. As shown in FIG. 4, the screen-unlocking system of this embodiment comprises:

a display module 401, being configured to display at least a first pattern at a first position and display a second pattern at a second position on a screen when the screen is in a locked state;

a first determining module 402, being configured to receive a first instruction generated by at least one clicking or touching on the screen, and determine whether the first instruction is generated by at least one clicking or touching on the first pattern;

a first controlling module 403, being configured to control to activate a waiting for another instruction generated by at least another clicking or touching according to the first instruction if the first instruction is generated by at least one clicking or touching on the first pattern;

a second determining module 404, being configured to receive a second instruction generated by at least another clicking or touching on the screen, and determine whether the second instruction is generated by the at least another clicking or touching on the second pattern; and a second controlling module 405, being configured to control to terminate the waiting for the another instruction generated by the another clicking or touching to unlock the screen if the second instruction is generated by the at least another clicking or touching on the second pattern.

A touch screen 406 of the touch screen terminal is connected with the display module 401, the first determining module 402 and the second determining module 404 of the screen-unlocking system respectively.

Figure 5:
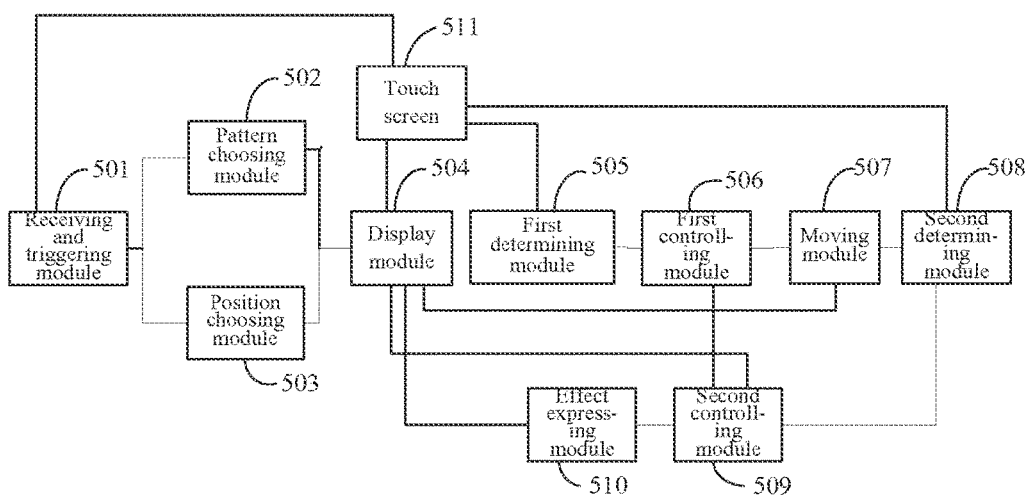
FIG. 5 is a functional block diagram of another embodiment of the screen-unlocking system according to the present disclosure.

Referring to FIG. 5, FIG. 5 is a functional block diagram of another embodiment of a screen-unlocking system according to the present disclosure. As shown in FIG. 5, the screen-unlocking system of this embodiment comprises:

a receiving and triggering module 501, being configured to receive an instruction of lighting up the screen to light up the screen when the screen is in a locked state;

where the receiving and triggering module is integrated onto any physical button of the device, and the screen can be lighted up as long as the physical button of the device is pressed;

a pattern-choosing module 502, being configured to randomly choose the first pattern and the second pattern to be displayed and output the first pattern and the second pattern that are chosen to the display module after the instruction of lighting up the screen is received;

a position-choosing module 503, being configured to randomly choose the first position at which the first pattern should be displayed and the second position at which the second pattern should be displayed, and output the first position and the second position to the display module after the instruction of lighting up the screen is received;

a display module 504, being configured to display at least one first pattern at a first position and display a second pattern at a second position on a screen when the screen is in the locked state;

a first determining module 505, being configured to receive a first instruction generated by at least one clicking or touching on the screen, and determine whether the first instruction is generated by at least one clicking or touching on the first pattern;

a first controlling module 506, being configured to control to activate a waiting for another instruction generated by at least another clicking or touching according to the first instruction if the first instruction is generated by the at least one clicking or touching on the first pattern;

a moving module 507, being configured to control the display module moving the first pattern to bypass the position of the second pattern along a random or predetermined trace on the screen after activating the waiting for the another instruction generated by the at least another clicking or touching according to the first instruction;

a second determining module 508, being configured to receive a second instruction generated by at least another clicking or touching on the screen, and determine whether the second instruction is generated by the at least another clicking or touching on the second pattern;

a second controlling module 509, being configured to control to terminate the waiting for the another instruction generated by the another clicking or touching to unlock the screen if the second instruction is generated by the at least another clicking or touching on the second pattern; and an effect-expressing module 510, being configured to control the display module displaying that the first pattern is moved to the position of the second pattern and displaying an animation in which a target is hit if the second instruction is generated by the at least another clicking or touching on the second pattern.

The display module is integrated onto a video card of the device, and the pattern-choosing module, the position-choosing module, the first determining module, the first controlling module, the moving module, the second determining module, the second controlling module, and the effect-expressing module are integrated onto the CPU of the device so as to achieve the corresponding effect.

A touch screen 511 of the touch screen terminal is connected with the receiving and triggering module 501, the display module 504, the first controlling module 505 and the second controlling module 508 of the screen-unlocking system respectively.

The present disclosure further provides a touch screen terminal that comprises any one of the screen-unlocking systems of the aforesaid embodiments. The touch screen terminal may be (but is not limited to) a mobile phone having a touch screen, a tablet computer and a digital photo frame, or the like.

As can be known from the above descriptions of the embodiments, as compared to the prior art, one advantage of the present disclosure is that: the user can conveniently unlock the screen by touching unlocking patterns respectively at least two times without the need of sliding on and touching the screen continuously.

As compared to the prior art, another advantage of the present disclosure is that: unlocking interface backgrounds and patterns are diversified and the positions of the unlocking patterns may be not unfixed, which brings more abundant and wonderful experiences to the user.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A screen-unlocking method, comprising:
   displaying at least one first pattern at a first position on a screen when the screen is in a locked state;
   receiving a first response generated by at least one clicking or touching on the screen, and determining whether the first response is generated by the at least one clicking or touching on the first pattern;
   activating a waiting for another response generated by at least another clicking or touching according to the first response if the first response is generated by the at least one clicking or touching on the first pattern;
   receiving a second response generated by at least another clicking or touching on the screen, and determining whether the second response is generated by the at least another clicking or touching on at least one second pattern, wherein the second pattern is displayed at a second position, the first position is different from the second position, and the first pattern and the second pattern are two object patterns that are operatively used in combination by one or more further clicking or touching to move one of the first and second patterns to the location of the other and providing animation when this has occurred; and
   terminating the waiting for the another response generated by the another clicking or touching to unlock the screen if the second response is generated by the at least another clicking or touching on the second pattern, such that the screen is unlocked by clicking or touching the first pattern and the second pattern respectively, without sliding on or touching the screen continuously.

2. The method of claim 1, wherein the step of activating a waiting for another response generated by at least another clicking or touching according to the first response comprises:
   activating the waiting for the another response generated by the at least another clicking or touching according to the first response, and meanwhile, moving the first pattern to bypass the position of the second pattern along a random or predetermined trace on the screen.

3. The method of claim 1, wherein the step of terminating the waiting for the another response generated by the another clicking or touching if the second response is generated by the at least another clicking or touching on the second pattern, comprises: if the second response is generated by the at least another clicking or touching on the second pattern, moving the first pattern to the position of the second pattern and displaying an animation in which the second pattern used as a target is hit by the first pattern, so as to terminate the waiting for the another response generated by the another clicking or touching.

4. The method of claim 1, wherein the step of displaying at least one first pattern at a first position on a screen when the screen is in a locked state, comprises: when the screen is in the locked state, receiving an input of lighting up the screen to light up the screen, and meanwhile, displaying the at least one first pattern and the at least one second pattern at the first position and the second position of the screen respectively.

5. The method of claim 4, wherein the step of displaying the at least one first pattern and the at least one second pattern at the first position and the second position of the screen respectively, comprises: displaying the at least one first pattern and the at least one second pattern that are chosen randomly at the first position and the second position of the screen respectively.

6. The method of claim 5, wherein the step of displaying the at least one first pattern and the at least one second pattern at the first position and the second position of the screen respectively, comprises: displaying the at least one first pattern and the at least one second pattern that are chosen randomly, at the first position and the second position, which are chosen randomly, of the screen respectively.

7. The method of claim 1, wherein the second pattern is displayed after the step of activating the waiting for another response generated by at least another clicking or touching, such that the second pattern is not displayed in the steps of displaying the at least one first pattern at the first position on the screen, receiving the first response generated by the at least one clicking or touching on the screen, and activating the waiting for another response generated by at least another clicking or touching.

* * * * *